United States Patent
Liao

(10) Patent No.: US 7,072,002 B2
(45) Date of Patent: Jul. 4, 2006

(54) REAR-PROJECT VIDEO ASSEMBLY WITH A FOLDABLE REFLECTOR

(75) Inventor: Chen Sung Liao, Taichung (TW)

(73) Assignee: Disk King Technology Co., Ltd., Taichung (TW)

( * ) Notice: Subject to any disclaimer, the term of this patent is extended or adjusted under 35 U.S.C. 154(b) by 545 days.

(21) Appl. No.: 10/611,927

(22) Filed: Jul. 3, 2003

(65) Prior Publication Data

US 2005/0001939 A1  Jan. 6, 2005

(51) Int. Cl.
*H04N 5/64* (2006.01)
(52) U.S. Cl. ............... 348/787; 348/788; 348/789; 348/836; 348/838; 348/839; 348/843; 353/77; 353/119; 359/460; 359/506
(58) Field of Classification Search ........ 348/787–789, 348/836, 838, 839, 843; 353/74, 77, 101, 353/119; 359/460, 506, 507; H04N 5/64
See application file for complete search history.

(56) References Cited

U.S. PATENT DOCUMENTS

| | | | | |
|---|---|---|---|---|
| 5,510,806 A | * | 4/1996 | Busch | 345/87 |
| 5,999,232 A | * | 12/1999 | Kepley et al. | 348/744 |
| 6,137,547 A | * | 10/2000 | Iijima et al. | 348/789 |
| 6,334,687 B1 | * | 1/2002 | Chino et al. | 353/79 |
| 6,525,750 B1 | * | 2/2003 | Knox | 345/30 |
| 6,637,896 B1 | * | 10/2003 | Li et al. | 353/119 |
| 6,814,449 B1 | * | 11/2004 | Yamada et al. | 353/74 |
| 6,873,460 B1 | * | 3/2005 | Burstyn et al. | 359/461 |
| 2003/0137611 A1 | * | 7/2003 | Chang et al. | 348/787 |

* cited by examiner

*Primary Examiner*—Brian P. Yenke

(74) *Attorney, Agent, or Firm*—Rosenberg, Klein & Lee

(57) ABSTRACT

A rear-project video assembly with a foldable reflector includes a housing and a screen mounted in a first side of the housing. A reflector has one side pivotally connected to a second side of the housing for reflecting image to the screen. An overhead projector is mounted on a bottom of the housing for projecting image to the reflector and a drive device is mounted between the screen and the reflector for expanding the reflector when using the reflector and backward moving the reflector after using the reflector to reduce the volume of the rear-project video assembly. A bellows is mounted between the peripheries of the second side of the housing and the reflector to prevent the foreign matter and the light ray from entering the housing.

11 Claims, 5 Drawing Sheets

REAR-PROJECT VIDEO ASSEMBLY WITH A FOLDABLE REFLECTOR

BACKGROUND OF THE INVENTION

1. Field of the Invention

The present invention relates to a video assembly, and more particularly to a rear-project video assembly with a foldable reflector.

2. Description of Related Art

A conventional rear-project video assembly in accordance with the prior art shown in FIG. 4 comprises a housing (6), a screen (61) attached to a vertical first side of the housing (6) and a reflector (62) mounted on a downward slanting second side of the housing (6) for reflecting image to the screen (61). An overhead projector (63) is mounted on a bottom of the housing (6) for projecting image to the reflector (62).

With reference to FIG. 5 that shows a second conventional rear-project video assembly, the second conventional rear-project video assembly comprises a housing (7), a screen (71) attached to a vertical first side of the housing (7), a first reflector (72) mounted on a downward slanting second side of the housing (7) and a second reflector (74) mounted under the screen (71) and facing the first reflector (72). An overhead projector (73) is mounted on a bottom of the housing (7) for projecting the image to the second reflector (74) that projects the image to the first reflector (72). The first reflector (72) reflects the image from the second reflector (74) to the screen (71).

As regard to the above two conventional rear-project video assembly video assembly, an angle (θ) is formed with the reflector (62/72) and the screen (61/71) for reflecting the image to the screen (61/71) wherever the overhead projector (63/73) is mounted. Consequently, the total depth (L) is elongated such that the volume is increased that will take much money for stored and transporting to the manufacturer and occupy a great room in the living room to the user.

The present invention has arisen to mitigate and/or obviate the disadvantages of the conventional rear-project video assemblies.

SUMMARY OF THE INVENTION

The main objective of the present invention is to provide an improved rear-project video assembly that includes a foldable reflector for reducing the volume thereof during being stored and transported.

To achieve the objective, the rear-project video assembly in accordance with the present invention comprises a housing and a screen mounted in a first side of the housing. A reflector has one side pivotally connected to a second side of the housing for reflecting image to the screen. An overhead projector is mounted on a bottom of the hosing for projecting image to the reflector and a drive device is mounted between the screen and the reflector for expanding the reflector when using the reflector and backward moving the reflector after using the reflector to reduce the volume of the rear-project video assembly. A bellows is mounted between the peripheries of the second side of the housing and the reflector to prevent the foreign matter and the light ray from entering the housing.

Further benefits and advantages of the present invention will become apparent after a careful reading of the detailed description with appropriate reference to the accompanying drawings.

DETAILED DESCRIPTION OF THE INVENTION

Figure 1:
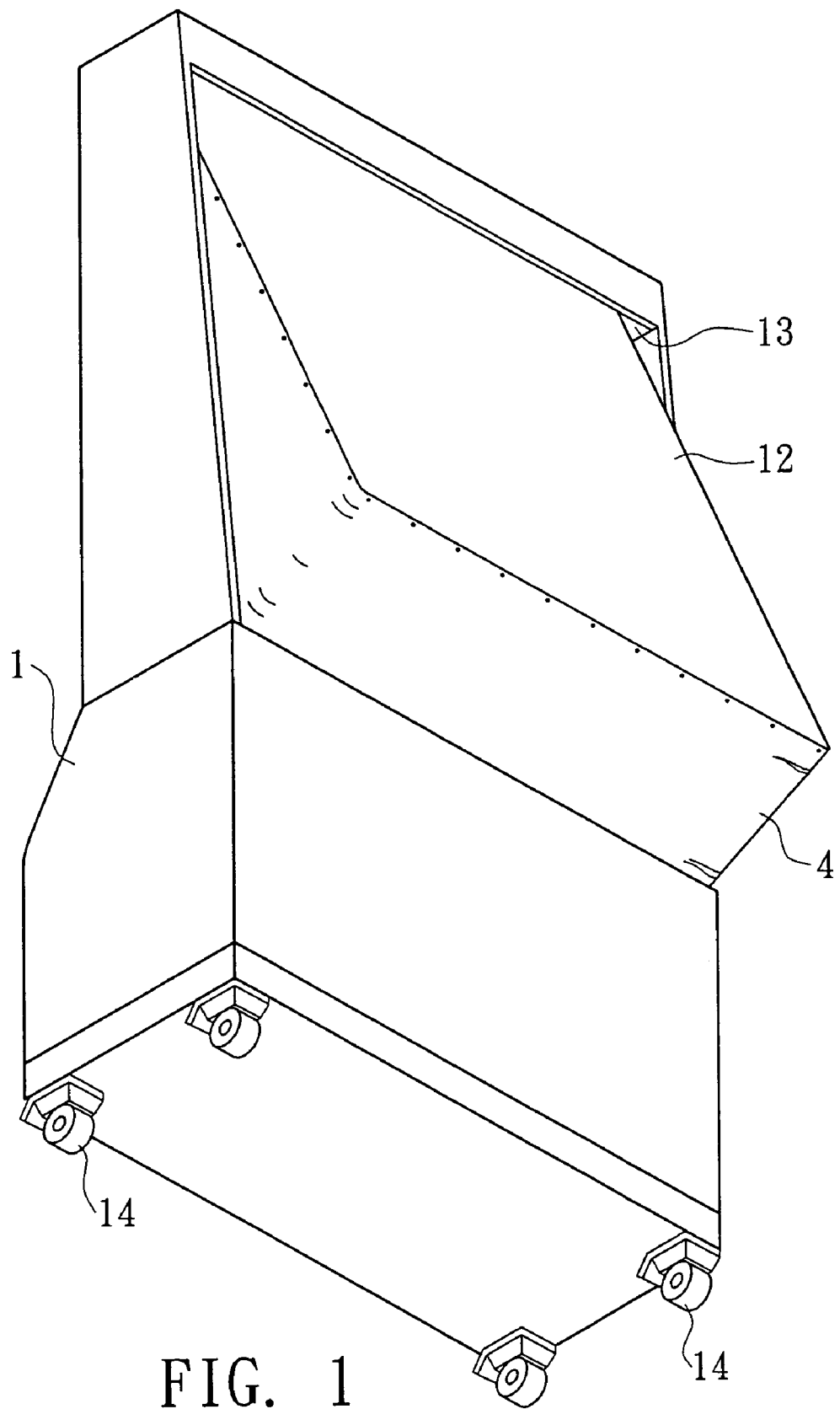
FIG. 1 is a perspective view of a rear-project video assembly with a foldable reflector in accordance with the present invention.
Figure 2:
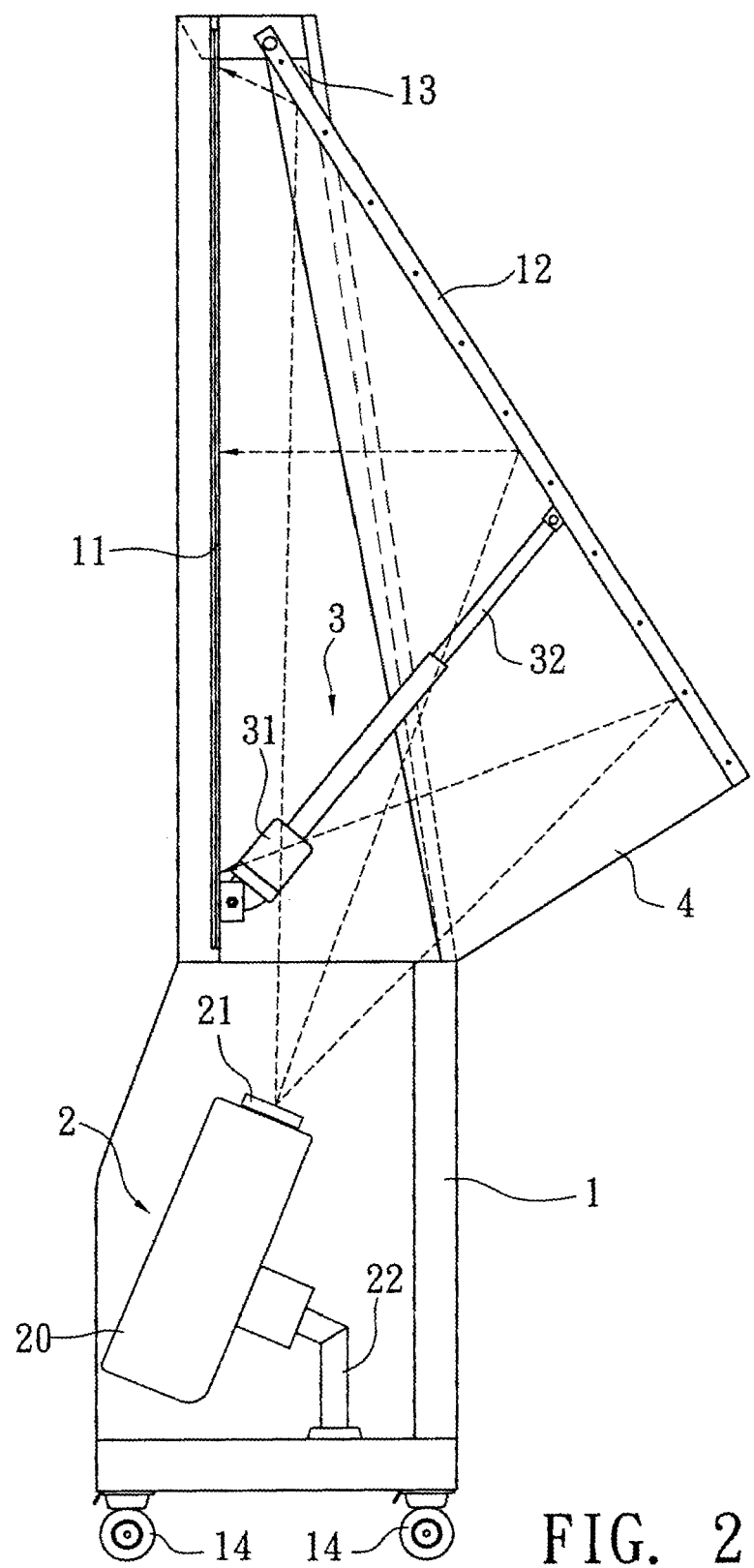
FIG. 2 is a side plan view of the rear-project video assembly in FIG. 1 during being using.
Figure 3:
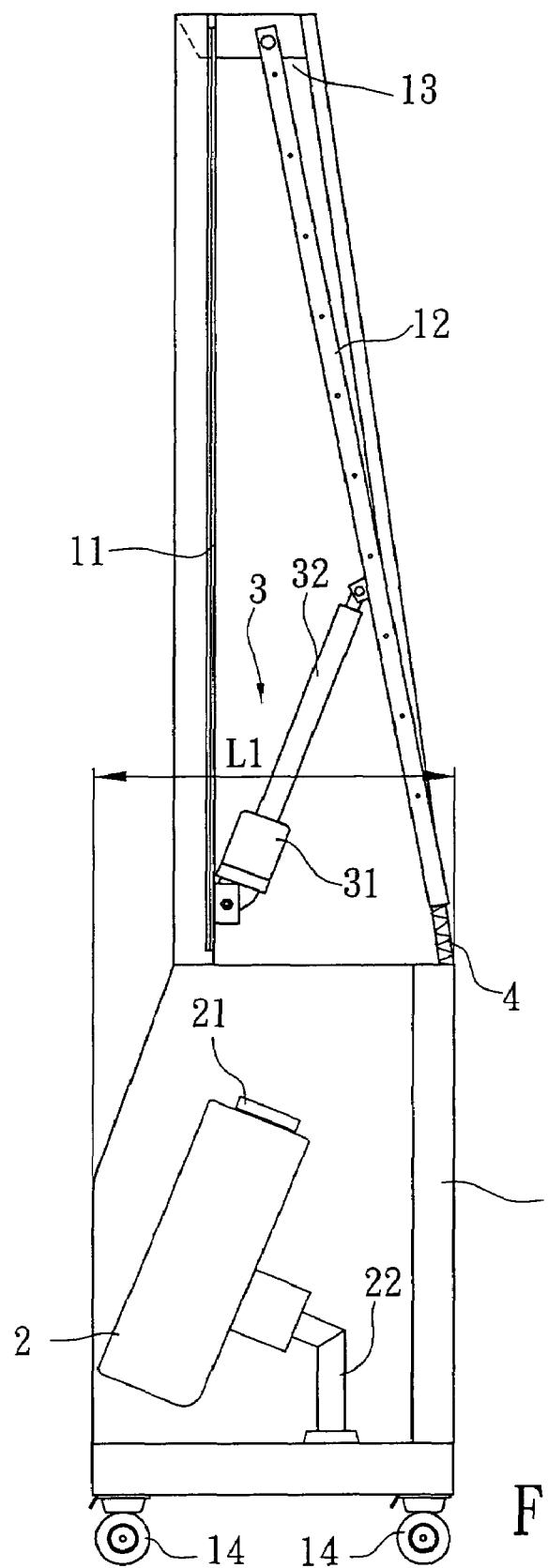
FIG. 3 is a side plan view of the rear-project video assembly in FIG. 1 when the reflector is moved toward the screen for reducing the volume of the rear-project video assembly in accordance with the present invention.
Figure 4:
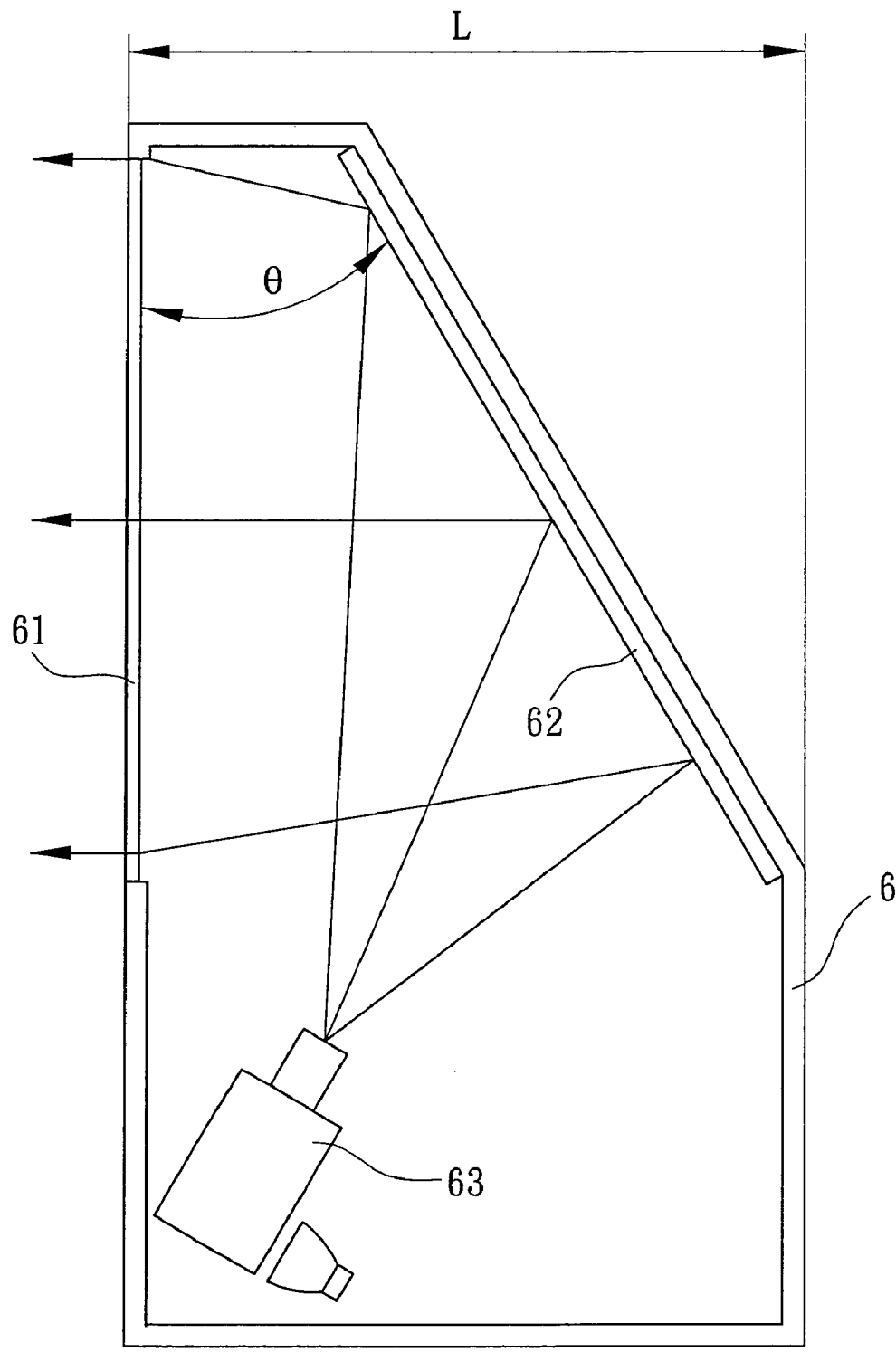
FIG. 4 is a side plan view of a first conventional rear-project video assembly in accordance with the prior art.
Figure 5:
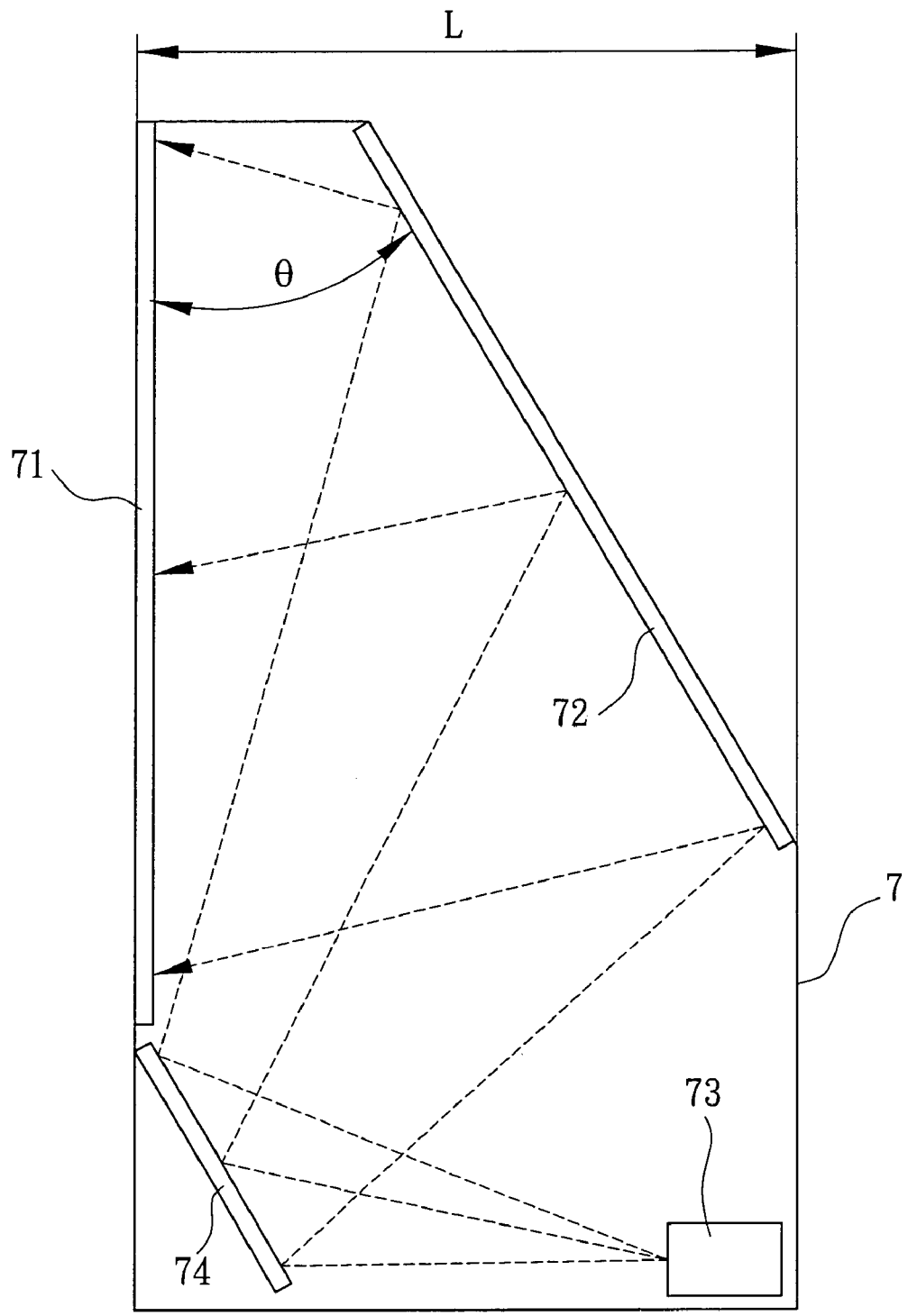
FIG. 5 is a side plan view of a second conventional rear-project video assembly in accordance with the prior art.

Referring to the drawings and initially to FIGS. 1–3, a rear-project video assembly with a foldable reflector in accordance with the present invention comprises housing (1) with multiple rollers (14) mounted on a bottom of the housing (1) for easily moving the present invention. A screen (11) is mounted within a first side of the housing (1) and an opening (13) is defined in a second side of the housing (1). A reflector (12) has one side pivotally connected to a top of housing (1) and corresponds to the opening (13) in the second side of the housing (1). The reflector (12) has a size slightly smaller than that of the opening (13) such that the reflector (12) can be moved and received in the hosing (1) after being used.

An overhead projector (2) is mounted on a bottom of the housing (1). The overhead projector (2) including a body (20) and a stand (22) that includes a first end secured on the bottom of the housing (1) and a second end connected to and supporting the body (20). The overhead projector (2) includes a lens (21) mounted thereon and facing the reflector (12) for projecting image to the reflector (12) when the reflector (12) is expanded.

A drive device (3) is mounted between the screen (11) and the reflector (12). The drive device (3) includes a motor (31) with one end pivotally connected to the first side of the housing (1), and a telescope shaft (32) having a first end connected to the motor (31) and a second end pivotally connected to the reflector (12). The motor (31) drives the telescope shaft (32) to expand the reflector (12) when using the reflector (12) or backward move the reflector (12). A bellows (4) is mounted between the peripheries of the opening (13) and the reflector (12) to prevent the foreign matter and light ray from entering into the housing (1).

As described above, the depth of the rear-project video assembly with a foldable reflector in accordance with the present invention is reduced when the reflector (12) is received in the housing (1) after being moved toward the screen (11). Consequently, the volume of the rear-project video assembly is reduced when being packaged, stored and transported.

Although the invention has been explained in relation to its preferred embodiment, it is to be understood that many other possible modifications and variations can be made without departing from the spirit and scope of the invention as hereinafter claimed.

What is claimed is:

1. A rear-project video assembly with a foldable reflector, comprising:
   a housing;
   a screen mounted in a first side of the housing;
   a reflector having one side pivotally connected to a second side of the housing for reflecting image to the screen;
   an overhead projector mounted on a bottom of the housing for projecting image to the reflector;
   a drive device mounted between the screen and the reflector for expanding the reflector when using the reflector and backward moving the reflector after using the reflector to reduce the volume of the rear-project video assembly; and
   a bellows mounted between the peripheries of the second side of the housing and the reflector to prevent the foreign matter and the light ray from entering the housing.

2. The rear-project video assembly as claimed in claim 1, wherein the overhead projector comprises:
   a body;
   a stand having a first end secured on the bottom of the housing and a second end connected to the body for supporting the body; and
   a lens mounted on the body and facing the reflector for projecting image to the reflector when the reflector is expanded.

3. The rear-project video assembly as claimed in claim 2, wherein the housing comprises an opening defied in the second side of the housing and having a size slightly smaller than that of the reflector such that the reflector can be moved and received in the housing after being used, and the reflector having one side pivotally connected to a top of the housing and corresponding the opening.

4. The rear-project video assembly as claimed in claim 2, wherein the drive device comprises:
   a motor with one end pivotally connected to the first side of the housing; and
   a telescope shaft having a first end connected to the motor and a second end pivotally connected to the reflector, the motor driving the telescope shaft to reciprocally move the reflector.

5. The rear-project video assembly as claimed in claim 2 further comprising multiple rollers amounted on a bottom of the housing for easily moving the housing.

6. The rear-project video assembly as claimed in claim 1, wherein the housing comprises an opening defied in the second side of the housing and having a size slightly smaller than that of the reflector such that the reflector can be moved and received in the housing after being used, and the reflector having one side pivotally connected to a top of the housing and corresponding the opening.

7. The rear-project video assembly as claimed in claim 6, wherein the drive device comprises:
   a motor with one end pivotally connected to the first side of the housing; and
   a telescope shaft having a first end connected to the motor and a second end pivotally connected to the reflector, the motor driving the telescope shaft to reciprocally move the reflector.

8. The rear-project video assembly as claimed in claim 6 further comprising multiple rollers amounted on a bottom of the housing for easily moving the housing.

9. The rear-project video assembly as claimed in claim 1, wherein the drive device comprises:
   a motor with one end pivotally connected to the first side of the housing; and
   a telescope shaft having a first end connected to the motor and a second end pivotally connected to the reflector, the motor driving the telescope shaft to reciprocally move the reflector.

10. The rear-project video assembly as claimed in claim 9 further comprising multiple rollers amounted on a bottom of the housing for easily moving the housing.

11. The rear-project video assembly as claimed in claim 1 further comprising multiple rollers amounted on a bottom of the housing for easily moving the housing.

* * * * *